US008566950B1

(12) United States Patent
Smith et al.

(10) Patent No.: US 8,566,950 B1
(45) Date of Patent: Oct. 22, 2013

(54) METHOD AND APPARATUS FOR DETECTING POTENTIALLY MISLEADING VISUAL REPRESENTATION OBJECTS TO SECURE A COMPUTER

(75) Inventors: Spencer Dale Smith, El Segundo, CA (US); Adam Lyle Glice, Culver City, CA (US); Nicholas Robert Graf, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 507 days.

(21) Appl. No.: 12/705,867

(22) Filed: Feb. 15, 2010

(51) Int. Cl.
G06F 21/00 (2013.01)

(52) U.S. Cl.
USPC ............. 726/26; 726/22; 726/23; 726/24; 726/25; 705/51; 713/189; 713/190; 713/191; 713/192; 713/193; 713/194; 713/187; 717/168; 717/169; 717/170; 717/171; 717/172; 717/173; 717/174; 717/175; 717/176; 717/177; 717/178

(58) Field of Classification Search
USPC ................................................ 726/26, 22
See application file for complete search history.

(56) References Cited

U.S. PATENT DOCUMENTS

| | | | | |
|---|---|---|---|---|
| 7,690,035 | B2* | 3/2010 | Sasage et al. | 726/22 |
| 7,822,620 | B2* | 10/2010 | Dixon et al. | 705/1.1 |
| 7,962,955 | B2* | 6/2011 | Boss et al. | 726/22 |
| 2001/0027450 | A1* | 10/2001 | Shinoda et al. | 707/1 |
| 2004/0123117 | A1* | 6/2004 | Berger | 713/188 |
| 2004/0123157 | A1* | 6/2004 | Alagna et al. | 713/201 |
| 2004/0143822 | A1* | 7/2004 | Jager et al. | 717/140 |
| 2004/0205354 | A1* | 10/2004 | Gabriel et al. | 713/200 |
| 2005/0081157 | A1* | 4/2005 | Clark et al. | 715/736 |
| 2005/0108569 | A1* | 5/2005 | Bantz et al. | 713/201 |
| 2006/0010379 | A1* | 1/2006 | Kashi | 715/531 |
| 2006/0041508 | A1* | 2/2006 | Pham et al. | 705/50 |
| 2006/0095404 | A1* | 5/2006 | Adelman et al. | 707/3 |
| 2006/0106866 | A1* | 5/2006 | Green et al. | 707/104.1 |
| 2006/0253458 | A1* | 11/2006 | Dixon et al. | 707/10 |
| 2006/0253578 | A1* | 11/2006 | Dixon et al. | 709/225 |
| 2006/0253581 | A1* | 11/2006 | Dixon et al. | 709/225 |
| 2006/0253584 | A1* | 11/2006 | Dixon et al. | 709/225 |
| 2007/0006305 | A1* | 1/2007 | Florencio et al. | 726/22 |
| 2007/0028304 | A1* | 2/2007 | Brennan | 726/24 |
| 2007/0039038 | A1* | 2/2007 | Goodman et al. | 726/2 |
| 2008/0114641 | A1* | 5/2008 | Keenum | 705/10 |
| 2008/0155493 | A1* | 6/2008 | Zernik | 717/100 |
| 2008/0162231 | A1* | 7/2008 | Kahle et al. | 705/7 |
| 2008/0172741 | A1* | 7/2008 | Reumann et al. | 726/23 |
| 2009/0077383 | A1* | 3/2009 | de Monseignat et al. | 713/175 |
| 2009/0077664 | A1* | 3/2009 | Hsu et al. | 726/24 |
| 2009/0249445 | A1* | 10/2009 | Deshpande et al. | 726/3 |
| 2009/0259727 | A1* | 10/2009 | Patterson | 709/206 |
| 2010/0024036 | A1* | 1/2010 | Morozov et al. | 726/26 |

\* cited by examiner

*Primary Examiner* — Andy Rao
*Assistant Examiner* — Shan Elahi
(74) *Attorney, Agent, or Firm* — Wilmer Cutler Pickering Hale and Dorr LLP (57) ABSTRACT

A method and apparatus for detecting potentially misleading visual representation objects to secure a computer is described. In one embodiment, the method includes monitoring visual representation object creation with respect to the browser, accessing verification information, wherein the verification information comprises commonly used user interface elements for forming legitimate system messages, examining web data associated with the created visual representation objects, wherein the web data is compared with the verification information to identify imitating content within the created visual representation objects and modifying at least one of the created visual representation objects to accentuate the imitating content.

20 Claims, 8 Drawing Sheets

METHOD AND APPARATUS FOR DETECTING POTENTIALLY MISLEADING VISUAL REPRESENTATION OBJECTS TO SECURE A COMPUTER

BACKGROUND OF THE INVENTION

1. Field of the Invention

Embodiments of the present invention generally relate to a computer security system and, more particularly, to a method and apparatus for detecting potentially misleading visual representation objects that are created by a browser to secure a computer.

2. Description of the Related Art

Widespread Internet usage by small to large organizations results in an increase in computer-related attacks. Various malicious software programs (e.g., viruses, Trojan horses, worms and/or the like) cause many of these related computer attacks. These malicious software programs may be transmitted (i.e. downloaded) to a vulnerable computer without user consent and/or knowledge as executable programs, email attachments, multimedia files (e.g., video files, audio files and/or the like), malicious HTML code on web pages and/or the like.

The malicious software programs may exert control over an operating system and modify various files (e.g., system registry entries) and/or settings (e.g., background color, screen saver and/or the like) in order to disrupt normal operation. The malicious software programs may also exploit the user computer for illegitimate purposes. For example, a certain malicious software program may misappropriate sensitive data, such as intellectual property, customer data, medical histories, financial records, purchase orders, legal documents, privileged and/or confidential information, social security numbers, addresses, pictures, documents, contacts and/or the like.

Occasionally, a user may be enticed and/or redirected to a website that hosts such malicious software programs. The user may be enticed by an email or a posting on social networking websites (e.g., Orkut, Facebook, MySpeace and/or the like) that includes a link to the website. The user may also be enticed through a browser window that misrepresents legitimate system messages from an operating system. Such a browser window is made to appear very similar to an operating system dialog box, which normally notifies a computer user as to any computer problems.

The browser window includes web elements that, when rendered, presents the user with content (e.g., images, text, web objects and/or the like) that imitate user interface elements normally used for the legitimate system messages. The imitating content is used to mislead the computer user as to a source of the content. Because the computer cannot easily distinguish between the web elements and the user interface elements, the computer user is under the incorrect belief that the content includes an important system message from the operating system. After being confronted with the imitating content and following given instructions, the user computer downloads the malicious software programs, which may corrupt critical data and/or cause a system crash or system malfunctioning.

Therefore, there is a need in the art for a method and apparatus for detecting potentially misleading visual representation objects, such as browser windows, to secure a computer.

SUMMARY OF THE INVENTION

Various embodiments of the present invention generally comprise a method and apparatus for detecting potentially misleading visual representation objects to secure a computer. In one embodiment, a method for using one or more processors to detect potentially misleading visual representation objects in memory to secure a computer, includes monitoring visual representation object creation with respect to the browser, accessing verification information, wherein the verification information comprises commonly used user interface elements for forming legitimate system messages, examining web data associated with the created visual representation objects, wherein the web data is compared with the verification information to identify imitating content within the created visual representation objects and modifying at least one of the created visual representation objects to accentuate the imitating content.

In some embodiments, web elements are compared with the commonly used user interface elements to identify at least one web element that resolves to the imitating content within the at least one of the created visual representation objects. In some embodiments, the at least one identified web element is evaluated using a metric for detecting potentially misleading visual representation objects. In some embodiments, an attribute associated with the at least one of the created visual representation objects comprising the imitating content is modified.

In some embodiments, the examining step is performed before the created visual representation components become visible to the computer user. In some embodiments, reputation information is accessed for source identifiers that are associated with the created visual representation components and at least one source identifier having a low reputation is identified. In some embodiments, the imitating content is modified to notify a computer user of a potentially misleading visual representation object. In some embodiments, an input focus is prevented from being transferred to the at least one of the created visual representation objects.

In some embodiments, an input focus for the at least one of the created visual representation objects is disabled. In some embodiments, blocking input data from being communicated to the at least one of the created visual representation objects. In some embodiments, communication of the input data is permitted to the at least one of the created visual representation objects in response to user commands. In some embodiments, the at least one of the created visual representation objects is terminated, at least one source identifier associated with the at least one terminated visual representation object is determined and the at least one source identifier is added to reputation information.

In another embodiment, an apparatus for using one or more processors to detect potentially misleading visual representation objects in memory in order to secure a computer includes means for monitoring visual representation object creation by the browser, means for accessing verification information, wherein the verification information comprises commonly used user interface elements for forming legitimate system messages, means for examining web data associated with the created visual representation objects, wherein the web data is compared with the verification information to identify imitating content within the created visual representation objects and means for modifying at least one of the created visual representation objects to accentuate the imitating content.

In some embodiments, the apparatus further includes means for preventing an input focus from being transferred to the at least one of the created visual representation objects. In some embodiments, the apparatus further includes means for blocking input data from being communicated to the at least one of the created visual representation objects. In some embodiments, the apparatus further includes means for permitting input data communications for the at least one of the created visual representation objects in response to user commands. In some embodiments, the apparatus further includes means for terminating the at least one of the created visual representation objects, determining at least one source identifier associated with the at least one terminated visual representation object and adding the at least one source identifier to reputation information.

In yet another embodiment, a computer-readable-storage medium comprising one or more processor-executable instructions that, when executed by at least one processor, causes the at least one processor to monitor visual representation object creation by the browser, access verification information, wherein the verification information comprises commonly used user interface elements for forming legitimate system messages, examine web data associated with the created visual representation objects, wherein the web data is compared with the verification information to identify imitating content within the created visual representation objects and modify at least one of the created visual representation objects to accentuate the indicia of imitating content.

In some embodiments, the one or more processor-executable instructions, when executed by the at least one processor, causes the at least one processor to modify an attribute associated with the at least one of the created visual representation objects comprising the imitating content. In some embodiments, the one or more processor-executable instructions, when executed by the at least one processor, causes the at least one processor to prevent an input focus from being transferred to the at least one of the created visual representation objects.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Various embodiments of the present invention determine whether a given visual representation object, such as a browser window, is designed to imitate a legitimate system message and mislead a computer user into believing that the content was generated by an operating system. The content includes images and text that are determined to very similar to commonly used user interface elements for forming legitimate system messages. A modification module modifies the given visual representation object in order to delineate between web elements (e.g., HTML elements for creating a web page) and user interface elements. Furthermore, the modification module generates information notifying the computer user that the content is being used to misrepresent a legitimate system message from the operating system as explained further below.

Figure 1:
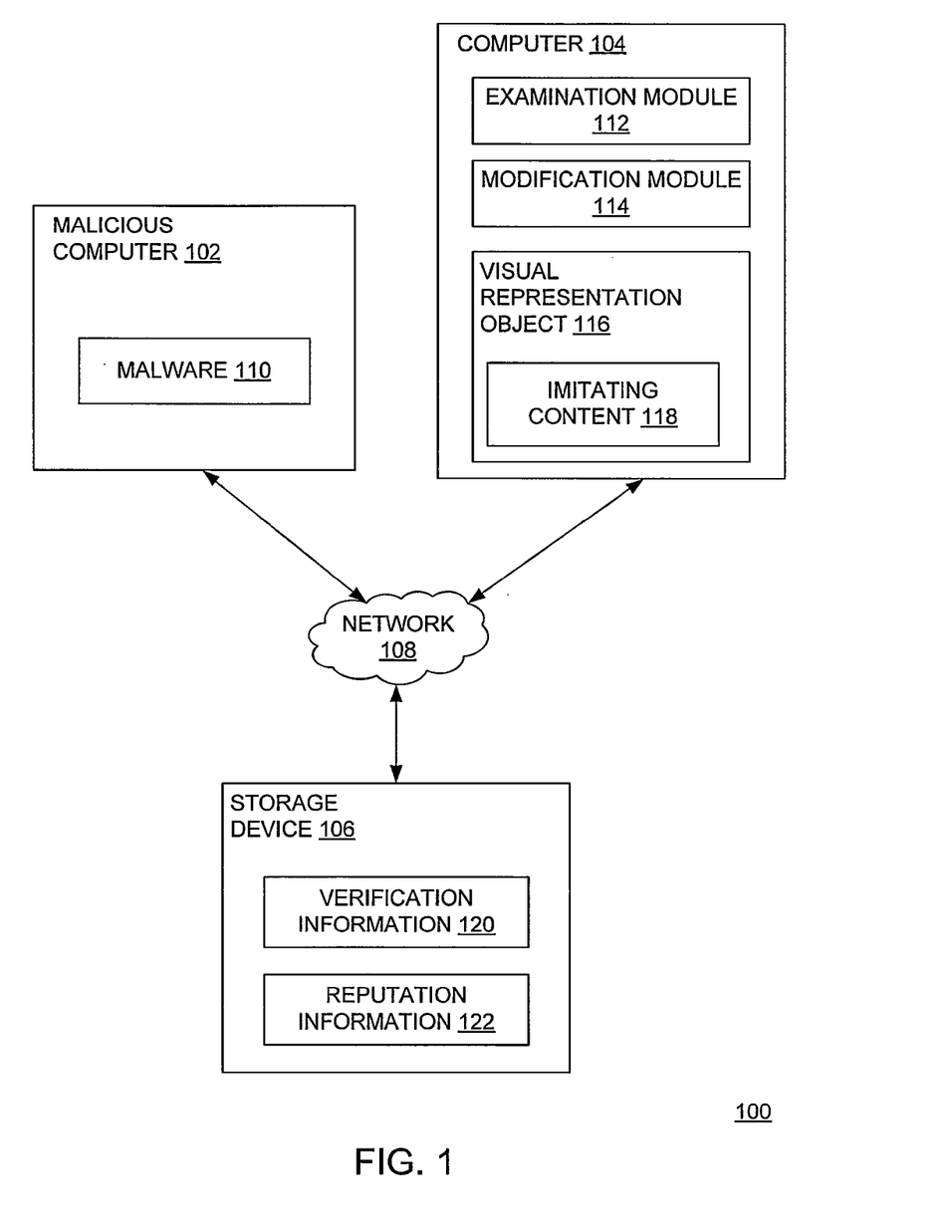
FIG. 1 is a block diagram of a system for detecting potentially misleading visual representation objects that are created by a web browser to secure a computer according to one or more embodiments of the present invention.

FIG. 1 is a block diagram of a system 100 for detecting potentially misleading visual representation objects that are created by a browser to secure a computer according to one or more embodiments of the present invention. The system 100 may includes a malicious computer 102, a computer 104, a storage device 106 where each is coupled to each other through a network 108.

The malicious computer 102 is a type of computing device (e.g., a laptop, a desktop, a Personal Digital Assistant (PDA) and/or the like), such as those generally known in the art. The malicious computer 102 includes malware 110 having malicious software code that destroys valuable computer data and/or disrupts computer operations. A hacker may utilize the malicious computer 102 to distribute the malware 110 to several computers, such as the user computer 104. As soon as the user computer 104 executes the malicious software code (e.g., spyware, viruses, rootkits and/or the like), the fraudulent software 110 compromises computer security by enabling malware transmission and execution, which causes critical operation disruption and/or sensitive data misappropriation (e.g., passwords, login names, credit card details and/or the like).

The computer 104 is a type of computing device (e.g., a laptop, a desktop, a Personal Digital Assistant (PDA) and/or the like) known to one of ordinary skill in the art having the benefit of this disclosure. The user computer 104 includes an examination module 112 and a modification module 114 as explained further below. Generally, people utilize the user computer 104 is utilized by the user to access various Internet resources, such as web pages, various content (e.g., dynamic or static content in the form of images, video and/or audio), online services (e.g., social networking), applications, databases and/or the like. The computer 104 also includes a visual representation object 116, such as a browser window, on a user interface. Visual representation object creation is monitored in order to identify content being used to further system message misrepresentation as explained in the present disclosure.

The storage device 106 generally includes various hardware and/or software that are configured to manage storage resources within the system 100. The storage device 106 may include one or more data storage drives (e.g., hard disk drives, optical drives, magnetic tape drives and/or the like) and storage management software that provides an interface (e.g., Integrated Drive Electronics/AT Attachment (IDE/ATA), Small Computer Systems Interface (SCSI) and/or the like) for one or more computing devices, such as the computer 104. In one embodiment, the storage device 106 maintains various data as one or more database systems, such as verification information 120 and reputation information 122.

The network 108 comprises a communication system that connects computers by wire, cable, fiber optic and/or wireless link facilitated by various types of well-known network elements, such as hubs, switches, routers, and the like. The network 108 may employ various well-known protocols to communicate information amongst the network resources. For example, the network 108 may be a part of the Internet using various communications infrastructure such as Ethernet, WiFi, WiMax, General Packet Radio Service (GPRS), and the like.

In some embodiments, the examination module 112 and the modification module 114 cooperate to identify imitating content 118 and notify the computer user as to a potentially misleading visual representation object 116. The modification module 114 modifies attributes associated the potentially misleading visual representation object 116 in order to attenuate the imitating content 118. For example, the imitating content 118 may be highlighted. As another example, the modification module 114 may change a border color encompassing the visual representation object 116.

Figure 2:
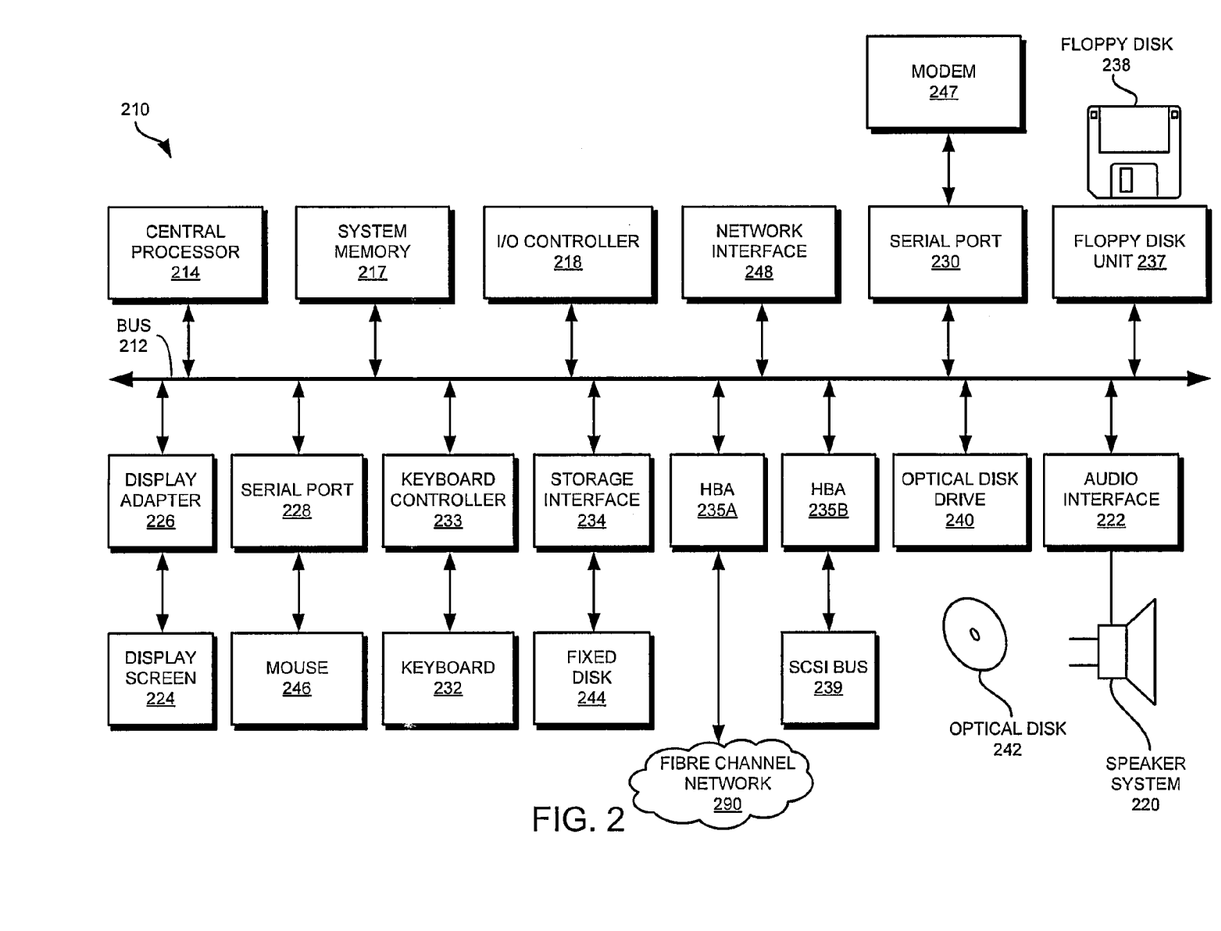
FIG. 2 is a block diagram of a suitable computer for implementing the present disclosure, according to one or more embodiments.

FIG. 2 is a block diagram of a computer system 210 suitable for implementing the present disclosure. This system 210 is representative of a computer system that can be used to implement the attack computer 102 and/or the user computer 104 of FIG. 1. Computer system 210 includes a bus 212 which interconnects major subsystems of computer system 210, such as a central processor 214, a system memory 217 (typically RAM, but which may also include ROM, flash RAM, or the like), an input/output controller 218, an external audio device, such as a speaker system 220 via an audio output interface 222, an external device, such as a display screen 224 via display adapter 226, serial ports 228 and 230, a keyboard 232 (interfaced with a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included are a mouse 246 (or other point-and-click device, coupled to bus 212 via serial port 228), a modem 247 (coupled to bus 212 via serial port 230), and a network interface 248 (coupled directly to bus 212).

Bus 212 allows data communication between central processor 214 and system memory 217, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral devices. Applications resident with computer system 210 are generally stored on and accessed via a computer readable medium, such as a hard disk drive (e.g., fixed disk 244), an optical drive (e.g., optical drive 240), a floppy disk unit 237, or other storage medium. Additionally, applications can be in the form of electronic signals modulated in accordance with the application and data communication technology when accessed via network modem 247 or interface 248.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. The operation of a computer system such as that shown in FIG. 2 is readily known in the art and is not discussed in detail in this application. Code to implement the present disclosure can be stored in computer-readable storage media such as one or more of system memory 217, fixed disk 244, optical disk 242, or floppy disk 238. The operating system provided on computer system 210 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 3:
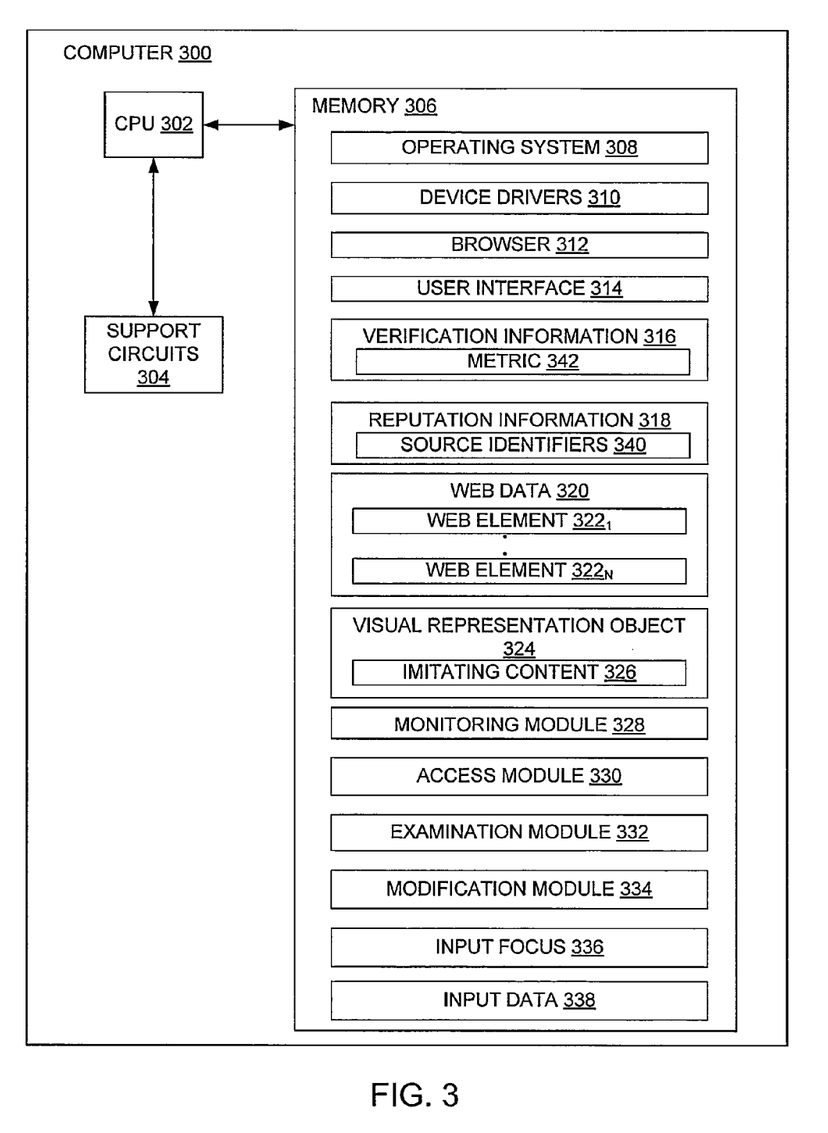
FIG. 3 is a block diagram of a computer for detecting potentially misleading visual representation objects that are created by a web browser to secure a computer according to one or more embodiments of the present invention.

FIG. 3 is a block diagram of a user computer 300 for detecting potentially misleading visual representation objects according to various embodiments.

The computer 300 is a type of computing device (e.g., a laptop, a desktop, a Personal Digital Assistant (PDA) and/or the like) that comprises a Central Processing Unit (CPU) 302, various support circuits 304 and a memory 306. The CPU 302 may comprise one or more commercially available microprocessors or microcontrollers that facilitate data processing and storage. Various support circuits 304 facilitate operation of the CPU 302 and may include clock circuits, buses, power supplies, input/output circuits and/or the like. The memory 306 includes a read only memory, random access memory, disk drive storage, optical storage, removable storage, and the like. The memory 306 includes an operating system 308, device drivers 310 as well as various additional software packages, such as a browser 312, a monitoring module 314, a comparison module 316, an identification module 318, a mitigation module 320, web data 320, suspicious feature information 324 and a comparison result 326. The memory 306 includes various data, such as verification information 316 and reputation information 318.

The operating system 308 generally manages various computer resources (e.g., network resources, data storage resources, file system resources and/or the like). The operating system 308 is configured to execute operations on one or more hardware and/or software devices, such as Network Interface Cards (NICs), hard disks, virtualization layers, firewalls and/or the like. For example, the various software packages call commands associated with the operating system 308 (i.e., native operating system commands) to perform various file system and/or storage operations, such as creating files or metadata, writing data to the files, reading data from the files, modifying metadata associated with the files and/or the like. The operating system 308 may call one or more functions associated with the device drivers 310 to execute various file system and/or storage operations. As an example, the operating system 308 may utilize a device driver associated with a Network Interface Card (NIC) card to communicate data to another computer as explained further below.

According to various embodiments, the browser 312 (e.g., Internet Explorer (IE), FireFox, Mozilla, Google Chrome and/or the like) includes software code that facilitates access to various Internet resources such as email, blogs, videos, periodicals, databases, social networking websites and/or the like. The user computer 300 may utilize the browser 312 to access such Internet resources. As such, the various Internet resources accessed by the user are maintained as the web data 320 as explained further below.

In one embodiment, the web data 320 includes source information associated with one or more websites visited by the computer user such as Uniform Resource Locators (URLs), domain names, file names and/or the like. For example, the user may regularly access the one or more websites to communicate with other users (e.g., through Instant Messaging (IM) and/or emails), conduct research (e.g., through educational websites, digital libraries and expert discussion forums), perform business applications (e.g., online securities trading and bank account management), for personal entertainment (e.g., downloading playing online videos, or games) and/or the like.

In some embodiments, the web data 320 includes web elements 322 that, when rendered, define content of the visual representation object 324. The web elements 322 may include software code that, when executed, provide functionality with content. For example, a particular web element 322 may be a button element that uses the software code (e.g., scripts) to handle various input data 338, such as peripheral device inputs (e.g., mouse clicks, keyboard stokes and/or the like). The software code may include interpreted software code in addition to source software code. For example, the web data 320 may include an HTML markup of JavaScript code.

In one embodiment, the web data 320 includes web documents (e.g., HTML documents) that define web pages to be presented to the computer user. These web pages are hosted by web sites and include images, text and various other web objects. As explained in the present disclosure, the examination module 332 is configured to examine the web documents and identify HTML elements and/or JavaScript code that resolve to a browser window misrepresenting a system message, such as an important failure by the operation system 308.

The visual representation objects 324 are user interface components of which various software modules create to interact with the computer user. The visual representation components 324 may be referred to as computer windows according to one or more embodiments. The operating system 308 may create certain computer windows, such as dialog boxes, message boxes, user interface controls and/or the like. The browser 312 may also create computer windows for presenting rendered web pages to the computer user. The browser 312 created computer windows are referred to as browser windows. In some embodiments, malicious computers attack the computer 300 by exploiting vulnerabilities and/or manipulating the browser windows.

Various attributes for the visual representation object 324 affect functionality and user interaction according to some embodiments. For example, an input focus 336 is an attribute indicating whether input data can be communicated to the visual representation object 324. In some embodiments, the visual representation object 324 further includes imitating content 326. For example, the visual representation object 324 may be a browser window having images and text that appear substantially similar to user interface elements that are commonly used for forming legitimate system messages as described further below.

In some embodiments, the verification information 316 includes commonly used user interface elements for forming legitimate system messages. Such system messages are presented to a computer user through visual representation objects, such as a computer window (e.g., a dialog box). Furthermore, the system messages may include important information associated with operations at the computer 300. For example, a legitimate system message may inform the computer user that vital computer resources are critical low (e.g., low memory, insufficient hard disk space and/or the like). The commonly used user interface elements are built on the user interface 314 and include menus, menu bars, tool bars, buttons (e.g., an "OK" button, a "CANCEL" button and/or the like), borders, client and/or input prompts and/or the like.

In one embodiment, the operating system 308 utilizes various ones of these commonly used user interface elements while creating the computer windows having the legitimate system messages. In one embodiment, the operating system 308 configures one or more attributes for defining content and appearance of the computer windows. As explained further below, the visual representation object 324 (e.g., a browser window) may be configured to present content that imitates these legitimate system messages and potentially misleads the computer user as to a source.

In some embodiments, the verification information 316 further includes a metric 342 for detecting potentially misleading visual representation objects. The metric 342 may include one or more pre-defined thresholds where each corresponds with a level of similarity between the web elements 322 and the commonly used user interface elements. Exceeding a particular pre-defined threshold indicate a certain likelihood that the imitating content 326 is being employed to misrepresent a legitimate system message. As explained further below, the examination module 332 evaluates the web elements 322 that resolve to the imitating content 326 using the metric 342.

In some embodiments, the reputation information 318 indicates source reputations 340 associated with at least one visual representation object 324. Each source reputation 340 corresponds with a unique source identifier. For example, application software, such as the browser 312, may correspond with a particular application instance handle, such as a globally unique identifier (GUID). As another example, a network or Internet resource may correspond with the unique source identifier 340, such as a URL or an Internet Protocol (IP) address. Some of these resources are associated with low source reputations 340 because content that is transmitted from such resources can include potentially misleading images and/or text as well as malicious software code. Therefore, any resource associated with a low source reputation 340 is most likely suspicious.

In some embodiments, the monitoring module 328 includes software code (e.g., processor-executable instructions) that is stored in the memory 306 and executed by the CPU 302. The monitoring module 328 may be a procedure that hooks function calls for creating the visual representation object 324. For example, the monitoring module 328 may hook a create window function or a notify window function in order to determine which application software made the function call and extract the web elements 322. Alternatively, the monitoring module 328 may be a browser helper object (BHO) that is loaded into the browser 312. As the browser helper object, the monitoring module 328 configures an interface (e.g., a Component Object Model (COM) interface) for accessing the web elements 322 (e.g., a Document Object Model (DOM) associated with a web page).

In some embodiments, the access module 330 includes software code (e.g., processor-executable instructions) that is stored in the memory 306 and executed by the CPU 302. The access module 330 communicates with storage devices (e.g., the storage device 106 of FIG. 1) across a Storage Area Network (SAN) and requests the verification information 316 and/or the reputation information 318. The access module 330 updates the verification information 316 with newly discovered user interface elements that are commonly used for forming the visual representation objects 324.

In some embodiments, the examination module 332 includes software code (e.g., processor-executable instructions) that is stored in the memory 306 and executed by the CPU 302. In one embodiment, the examination module 332 compares the web elements 322 with the verification information 316 to identify the imitating content 326. The examination module 322 may determine that a particular web element 322, when rendered on the user interface 314, imitates one or more commonly used user interface elements. For example, the examination module 332 may apply image and/or text processing techniques to the visual representation object 324 and identify portions of that appear substantially similar to the commonly used user interface elements.

In some embodiments, the modification module 334 includes software code (e.g., processor-executable instructions) that is stored in the memory 306 and executed by the CPU 302. The modification module 334 may modify one or more attributes associated with the visual representation object 324 to accentuate the imitating content 326. By modifying a border around the visual representation object 324, for example, the modification module 334 distinguishes between web pages from the Internet and legitimate system messages from the operating system 308. The computer user, as a result, benefits from such a distinction by safely remediating the potentially misleading visual representation object 324.

In some embodiments, the modification module 334 is instructed to terminate the visual representation object 324 if the imitating content 326 is determined to be misrepresenting legitimate system messages. As explained further below, the examination module 332 may use the metric 342 to achieve such a determination. The modification module 334 may terminate the visual representation object 324 after the imitating content 326 is presented to the computer user. In another embodiment, the modification module 334 may terminate the visual representation object 324 before becoming visible on the user interface 314. For example, the modification module 334 instructs the operating system 308 to change an attribute setting for making the visual representation object 324 visible after being created.

Figure 4:
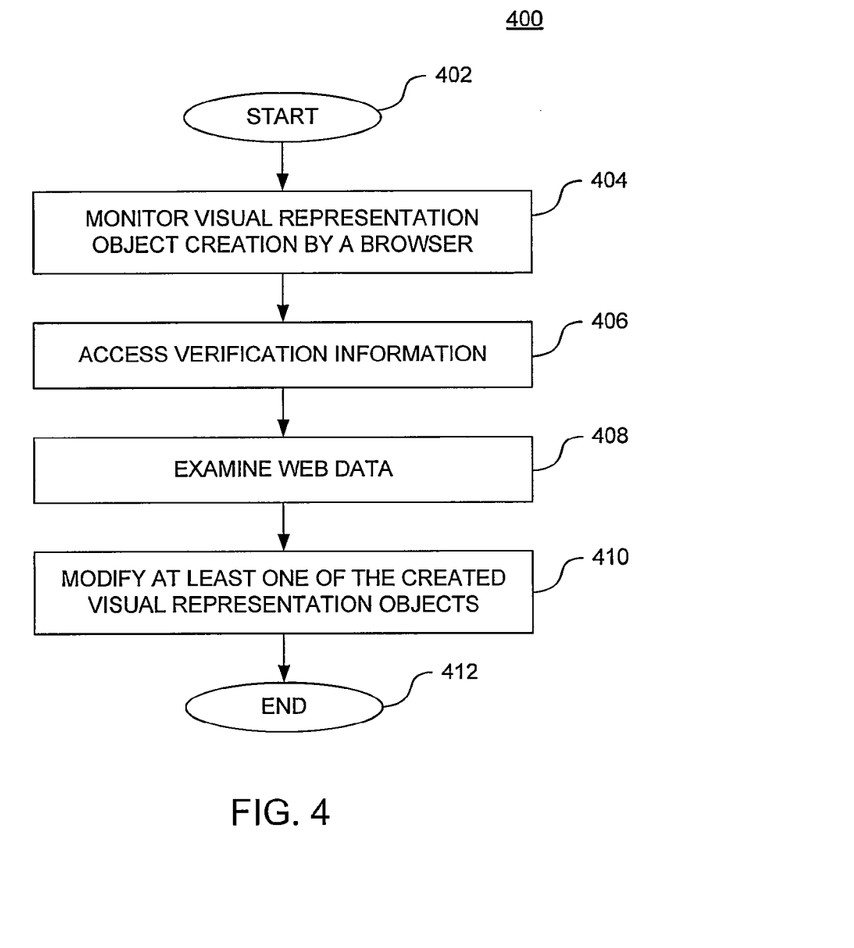
FIG. 4 is a flow diagram of a method for detecting potentially misleading visual representation objects that are created by a web browser to secure a computer according to one or more embodiments of the present invention.

FIG. 4 is a flow diagram of a method 400 for detecting potentially misleading visual representation objects that are created by a web browser to secure a computer according to one or more embodiments of the present invention.

The method 400 starts at step 402 and proceeds to step 404. At step 404, visual representation object creation is monitored. In some embodiments, a monitoring module (e.g., the monitoring module 328 of FIG. 3) intercepts various function calls (e.g., create window, create dialog and/or other function calls) from application software, such as a browser (e.g., the browser 312 of FIG. 3), and/or an operating system (e.g., the operating system 308 of FIG. 3). In one embodiment, the monitoring module also stores web data for the visual representation objects including HTML elements and/or JavaScript code. The HTML elements combined with an HTML markup of the JavaScript code resolve into content for the visual representation objects.

At step 406, verification information is accessed. In some embodiments, an access module (e.g., the access module 330 of FIG. 3) communicates requests to one or more storage devices (e.g., the storage device), which return the verification information (e.g., the verification information 316 of FIG. 3) in response. The access module receives the verification information and stores one or more commonly used user interface elements for forming legitimate system messages in memory (e.g., the memory 306 of FIG. 3).

At step 408, the web data is examined using the verification information. The web data, as explained in the present disclosure, includes web elements (e.g., the web elements 322 of FIG. 3) that define content within the created visual representation objects (e.g., browser windows). An examination module (e.g., the examination module 332 of FIG. 3) compares these web elements with the commonly used user interface elements according to one embodiment. When the browser adds interface functionality to web documents (e.g., HTML and XML documents), the examination module can access the interface (e.g., a Document Object Model (DOM) and extract the web elements.

The examination module determines whether one or more extracted web elements, when rendered and presented on a certain visual representation object, imitate commonly used user interface elements for forming legitimate system messages. In one embodiment, the examination module applies image and/or text processing techniques to the certain visual representation object, such as a computer window on the user interface, and identifies content imitating the legitimate system messages, such as operating system dialog boxes. The imitating content includes graphical images and/or text that are configured to mislead the computer user as to a source of the visual representation objects.

At step 410, at least one of the created visual representation objects are modified. When the imitating content (e.g., the imitating content 326) is identified in the certain visual representation object, the examination module calls a modification module (e.g., the modification module 334 of FIG. 3). According to some embodiments, the modification module modifies various attributes associated the certain visual representation object to accentuate the imitating content. For example, the modification module may change a background color or create a border around the certain visual presentation object. Furthermore, the modification module may add indicia of the imitating content. The indicia may include information warning a computer user that the certain visual representation object is potentially misleading. In this manner, the computer user recognizes that interacting with the imitating content may damage computer resources and disrupt computer operations. At step 412, the method 400 ends.

Figure 5:
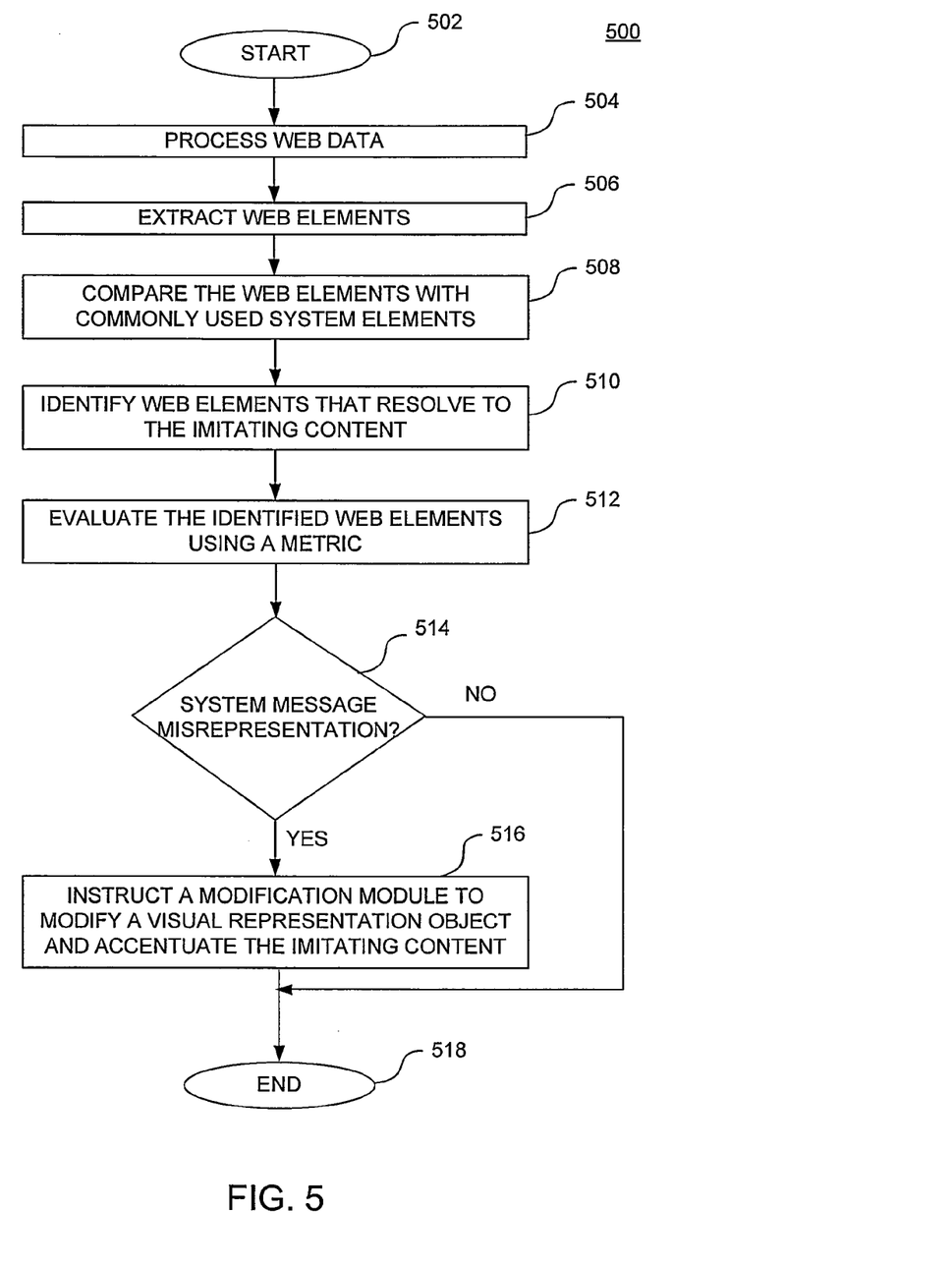
FIG. 5 is a flow diagram of a method for examining the web data to identify imitating content within a visual representation object according to one or more embodiments of the present invention.

FIG. 5 is a flow diagram of a method for examining the web data to identify imitating content within a visual representation object according to one or more embodiments of the present invention.

The method 500 starts at step 502 and proceeds to step 504. At step 504, web data is processed. In some embodiments, an examination module processes the web data and examines web documents having HTML data and JavaScript code. The HTML data and the JavaScript code may comprise one or more web elements (i.e., HTML elements) that resolve to text, images and/or other web objects. Once rendered, the HTML data and the JavaScript code produce a browser window having the resolved text, images and/or other web objects. At step 506, the web elements are extracted from the web data. At step 508, the web elements are compared with commonly used user interface elements for forming legitimate system messages.

At step 510, web elements are identified that resolve into content that imitates one or more of the commonly used user interface elements. At step 512, the identified web elements are evaluated using a metric. The metric (e.g., the metric 342 of FIG. 3) may be used for detecting potentially misleading visual representation objects that are created by a browser. As explained in the present disclosure, the metric includes a pre-defined threshold that, when exceeded, indicates that the visual representation object is potentially misleading. Furthermore, the imitating content is most likely being used to misrepresent a legitimate system message (e.g., an infection report from security software, a warning from an operating system and/or the like).

At step 514, a determination is made as to whether the identified web elements are misrepresenting the legitimate system message. If the web elements are not being used to misrepresent the legitimate system message, the method 500 proceeds to step 518. If, on the other hand, the web elements are misrepresenting the legitimate system message, then the method 500 proceeds to step 516. In some embodiments, the examination module compares the identified web elements to the pre-defined threshold. If the identified web elements exceed the pre-defined threshold, there is a strong likelihood that the visual presentation object is potentially misleading and the content is being used to achieve legitimate system message misrepresentation. At step 516, a modification module is instructed to modify the visual representation object and accentuate the imitating content. In one embodiment, the examination module instructs the modification module to modify various attributes to notify a computer user of the potentially misleading visual representation object. At step 518, the method 500 ends.

Figure 6:
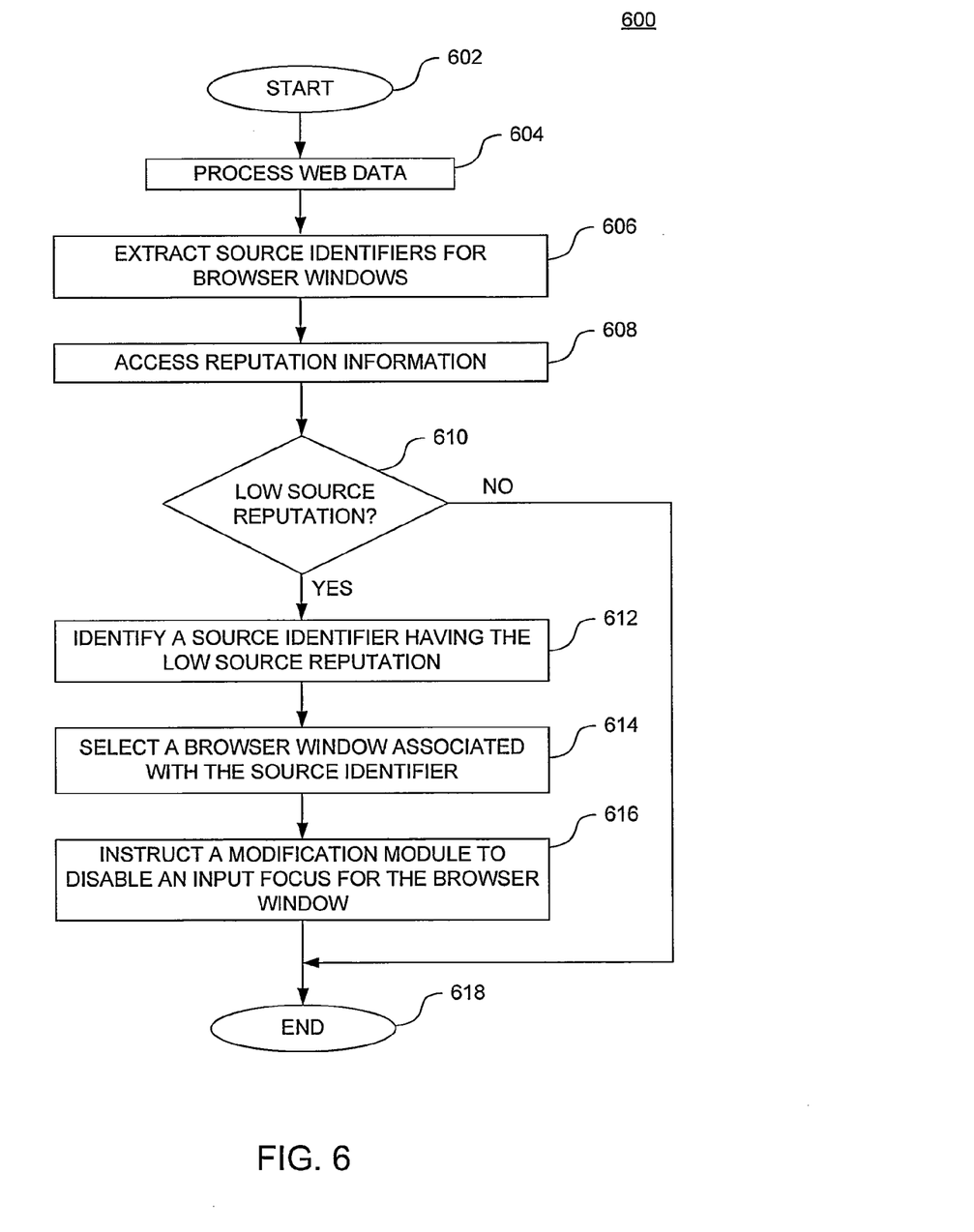
FIG. 6 is a flow diagram of a method for determining a browser window to be potentially misleading based on a source reputation according to one or more embodiments of the present invention.

FIG. 6 is a flow diagram of a method 600 for determining a browser window to be potentially misleading based on source reputation according to one or more embodiments of the present invention.

The method 600 starts at step 602 and proceeds to step 604. At step 604, web data is processed. As explained in the present disclosure, the web data defines one or more browser windows (e.g., the visual representation object 324 of FIG. 3) on a user interface (e.g., the user interface 314 of FIG. 3). At step 606, source identifiers for the browser windows are extracted from the web data. At step 608, reputation information is accessed. In one embodiment, an examination module (e.g., the examination module 332 of FIG. 3) processes the reputation information (e.g., the reputation information 318 of FIG. 3) and identifies source reputations (e.g., the source reputations 340 of FIG. 3) associated with the extracted source identifiers.

At step 610, a determination is made as to whether the reputation information indicates a low source reputation for any of the browser windows. If one or more browser windows have a low source reputation, the method 600 proceeds to step 612. If, on the other hand, none of the browser windows are associated with low source reputation, then the method 600 proceeds to step 618. At step 612, a source identifier having the low source reputation is identified. At step 614, a browser window associated with the source identifier is selected. In one embodiment, the examination module examines each and every source reputation associated with the unique source identifiers. If a particular source identifier is associated with a low source reputation, the examination module identifies the browser window presenting content associated with the particular source identifier. The content is transmitted from computers having the particular source identifier and may include misleading images and/or text as well as malicious software code.

At step 616, a modification module is instructed to disable an input focus for the identified browser window. In some embodiments, the examination module instructs the modification module (e.g., the modification module 334 of FIG. 3) to modify the input focus (e.g., the input focus 336 of FIG. 3). The input focus may be property of the browser window. As such, the modification module changes the property setting such that the browser window does not receive input data (e.g., the input data 338) from a computer user. At step 618, the method 600 ends.

Figure 7A:
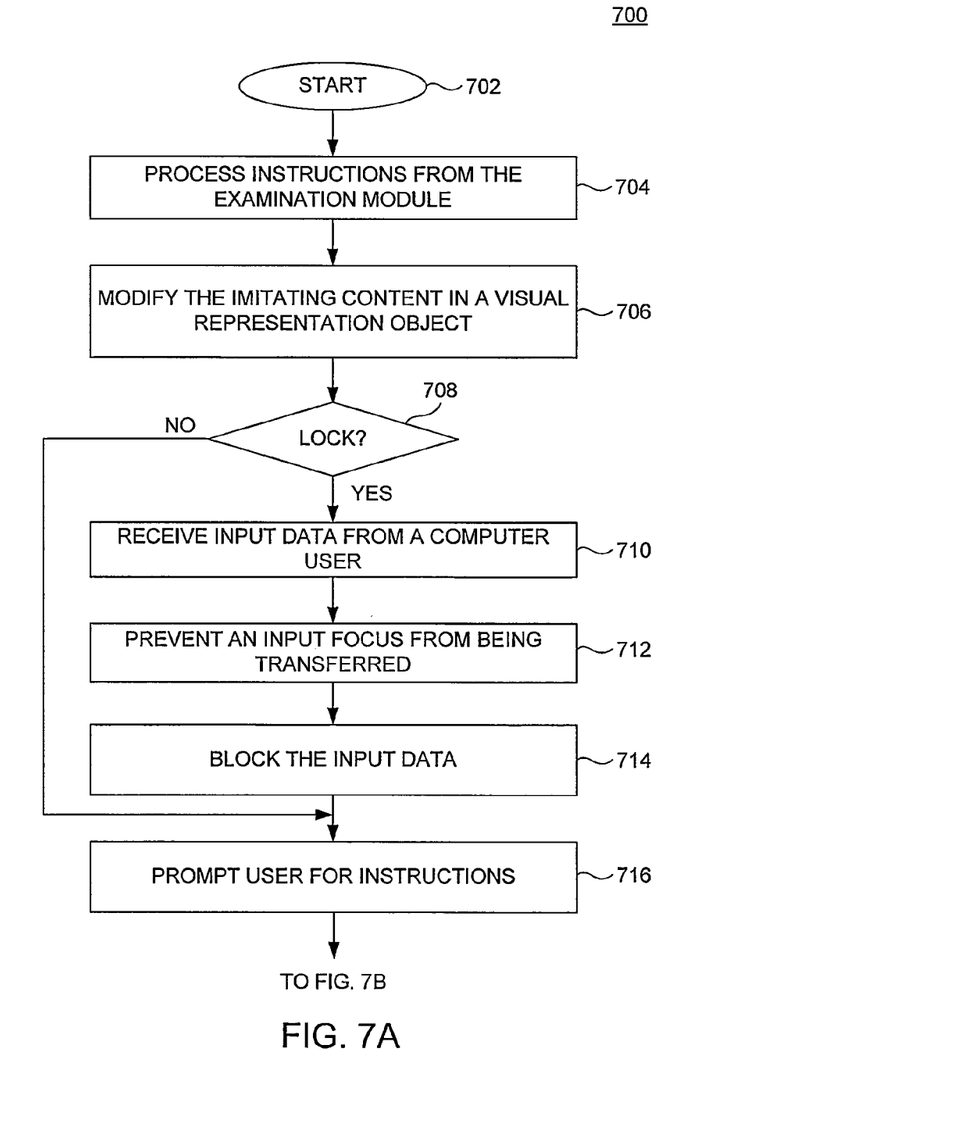
FIGS. 7A-B depict a flow diagram of a method for modifying a visual representation object to accentuate imitating content according to one or more embodiments of the present invention.
Figure 7B:
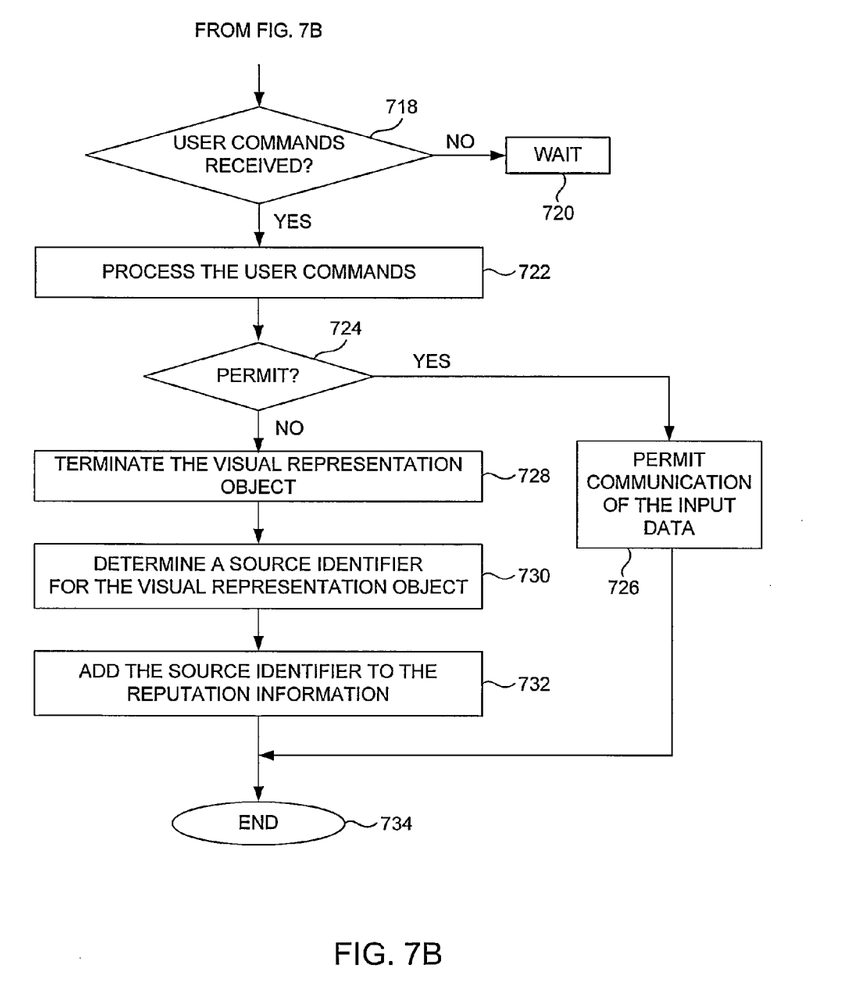

FIGS. 7A-B depict a flow diagram of a method 700 for modifying a visual representation object to accentuate imitating content according to one or more embodiments of the present invention.

The method 700 starts at step 702 and proceeds to step 704. At step 704, instructions from an examination module regarding a potentially misleading visual representation object is processed. At step 706, imitating content is modified such that a computer user is notified as to the potentially misleading visual representation object. In some embodiments, the modification module (e.g., the modification module 334 of FIG. 3) processes these instructions and proceeds to modify the imitating content accordingly. For example, the modification module deletes or highlights images and/text that comprise the imitating content. As another example, the modification module creates information notifying the computer user that the imitating content is mostly likely being used to misrepresent a legitimate system message.

The modification module may append such information to the visual presentation object. Alternatively, the modification module may terminate the visual representation component before becoming visible on the user interface and only present such information to the computer user. The information may include indicia of the imitating content in order to warn the computer user that malicious software code (e.g., the malware 110 of FIG. 1) may have infected a computer (e.g., the computer 104 of FIG. 1 or the computer 300 of FIG. 3).

At step 708, a determination is made as to whether the visual representation object is to be locked. If it is determined that the visual representation object is to be locked such that the computer user cannot interact with any portion therein, the method 700 proceeds to step 716. If, on the other hand, the visual representation object is not to be locked, then the method 700 continues to step 710. At step 710, input data for the visual representation object is received from the computer user. The input data (e.g., the input data 338 of FIG. 3) may include information that is generated through keyboard strokes, mouse clicks and other peripheral device inputs.

At step 712, an input focus is prevented from being transferred to the visual representation object. As mentioned throughout the present disclosure, when the visual representation object is created and made visible on the user interface, an operating system (e.g., the operating system 308 of FIG. 3) would normally transfer the input focus. The modification module, however, instructs the operating system to not perform such a transfer as normal because the visual representation object includes imitating content. In one embodiment, the modification module modifies an attribute setting such that the input focus (e.g., the input focus 336 of FIG. 3) is no longer associated with the visual representation object. By changing such an attribute setting, the computer user cannot interact with the imitating content. For example, if the computer user uses a mouse to click an "OK" button, information (i.e., signals) indicating the mouse click is not directed to the "OK" button. Accordingly, the "OK" button is not operated (i.e., depressed).

At step 714, the input data is blocked from the visual representation object. In one embodiment, software code (e.g., a windows procedure) within the operating system (e.g., the operating system 308 of FIG. 3) receives the input data being communicated to the visual representation object but does not process the input data. For example, the input data is prevented from being transferred to scripts running within the visual representation object (e.g., software code, such as JavaScript). These scripts generally handle various events associated with web elements of a browser window. Since the modification module does not allow the input data pass to the scripts as a parameter, the visual representation object cannot continue the legitimate system message misrepresentation.

At step 716, the computer user is prompted for commands regarding the visual representation object. If the visual representation object is locked, these commands indicate the computer user's desire to interact with the imitating content. For example, if the computer user determines that imitating content is actually legitimate, the computer user may instruct the medication module remove the lock and restore the input focus. At step 718, a determination is made as to whether the user commands are received. If the user commands are received, then the method 700 proceeds to step 722. If, on the other hand, the computer user did not communicate any commands, the method 700 proceeds to step 720. At step 720, the method 700 waits until the user commands are received.

At step 722, the user commands are processed. At step 724, a determination is made as to whether computer user desires to terminate the visual representation object. If the user commands indicate that the visual representation object is not to be terminated, the method 700 proceeds to step 726. At step 726, communication of the input data is permitted. In one embodiment, the modification module restores the input focus, which enables the input data to reach the visual representation object. After step 726, the method 700 proceeds to step 734.

If, on the other hand, the visual representation object is to be terminated, then the method 700 proceeds to step 728. At step 728, the visual representation object is terminated. For example, if the imitating content is benign and harmless, the computer user can terminate the visual representation object without damaging the computer. The modification module, in response, instructs the operating system to perform the browser window termination. At step 730, a source identifier for the visual representation object is determined. At step 732, the source identifier is added to reputation information. In one embodiment, the reputation information (e.g., the reputation information 318 of FIG. 3) indicates that the source identifier has a low source reputation and is most likely associated with a malicious web site. At step 734, the method 700 ends.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

The invention claimed is:

1. A method for using one or more processors to detect misleading browser window content, comprising:
    monitoring browser window creation with respect to a browser;
    accessing verification information, wherein the verification information comprises commonly used user interface elements for forming legitimate system messages and at least one metric for detecting misleading browser window content, wherein the at least one metric comprises at least one pre-defined threshold that corresponds with a level of similarity between web data associated with a created browser window and the commonly used user interface elements;
    examining the web data associated with the created browser window, wherein the web data is compared with the verification information to identify content within the created browser window, wherein web elements are compared with the commonly used user interface elements to identify a web element that resolves to the content; and
    modifying the created browser window to distinguish the content.

2. The method of claim 1, wherein examining the web data further comprises comparing web elements with the commonly used user interface elements to identify at least one web element that resolves to the content within the browser window.

3. The method of claim 2, further comprising evaluating the at least one identified web element based on the at least one metric for detecting misleading browser window content.

4. The method of claim 1, wherein modifying the created browser window further comprises modifying an attribute associated with the created browser window comprising the content.

5. The method of claim 1, wherein the examining step is performed before the created browser window becomes visible on the user interface.

6. The method of claim 1, wherein examining the web data further comprises:
    accessing reputation information for source identifiers that are associated with the created browser window; and
    identifying at least one source identifier having a low reputation.

7. The method of claim 1, wherein modifying the created browser window further comprises modifying the imitating content to notify a computer user of misleading browser window content.

8. The method of claim 1, wherein modifying the created browser window further comprises preventing an input focus from being transferred to the created browser window.

9. The method of claim 1, wherein modifying the created browser window further comprises disabling an input focus for the created browser window.

10. The method of claim 1, wherein modifying the created browser window further comprises blocking input data from being communicated to the created browser window.

11. The method of claim 10 further comprising permitting communication of the input data to the created browser window in response to user commands.

12. The method of claim 11 further comprising:
 terminating the created browser window;
  determining at least one source identifier associated with the terminated browser window; and
 adding the at least one source identifier to reputation information.

13. An apparatus for using one or more processors to detect misleading browser window content, comprising:
 means for monitoring browser window creation by a browser;
 means for accessing verification information, wherein the verification information comprises commonly used user interface elements for forming legitimate system messages and at least one metric for detecting misleading browser window content, wherein the at least one metric comprises at least one pre-defined threshold that corresponds with a level of similarity between web data associated with a created browser window and the commonly used user interface elements;
 means for examining the web data associated with the created browser window, wherein the web data is compared with the verification information to identify content within the created browser window, wherein web elements are compared with the commonly used user interface elements to identify a web element that resolves to the content; and
 means for modifying the created browser window to distinguish the content.

14. The apparatus of claim 13 further comprising means for preventing an input focus from being transferred to the created browser window.

15. The apparatus of claim 13 further comprising means for blocking input data from being communicated to the created browser window.

16. The apparatus of claim 13 further comprising means for permitting input data communications for the created browser window in response to user commands.

17. The apparatus of claim 13 further comprising means for terminating the created browser window, determining at least one source identifier associated with the terminated browser window, and adding the at least one source identifier to reputation information.

18. A non-transitory computer-readable-storage medium comprising one or more processor-executable instructions that, when executed by at least one processor, causes the at least one processor to:
 monitor browser window creation by a browser;
 access verification information, wherein the verification information comprises commonly used user interface elements for forming legitimate system messages and at least one metric for detecting misleading browser window content, wherein the at least one metric comprises at least one pre-defined threshold that corresponds with a level of similarity between web data associated with a created browser window and the commonly used user interface elements;
 examine the web data associated with the created browser window, wherein the web data is compared with the verification information to identify content within the created browser window, wherein web elements are compared with the commonly used user interface elements to identify a web element that resolves to the content; and
 modify the created browser window to distinguish the content.

19. The non-transitory computer-readable-storage medium of claim 18 further comprising one or more processor-executable instructions that, when executed by the at least one processor, causes the at least one processor to:
 modify an attribute associated with the created browser window comprising the content.

20. The non-transitory computer-readable-storage medium of claim 18 further comprising one or more processor-executable instructions that, when executed by the at least one processor, causes the at least one processor to:
 prevent an input focus from being transferred to the created browser window.

* * * * *